United States Patent
Yacout et al.

(10) Patent No.: US 9,437,335 B2
(45) Date of Patent: Sep. 6, 2016

(54) DESIGNED POROSITY MATERIALS IN NUCLEAR REACTOR COMPONENTS

(71) Applicants: A. M. Yacout, Naperville, IL (US);
Michael J. Pellin, Naperville, IL (US);
Marius Stan, Chicago, IL (US)

(72) Inventors: A. M. Yacout, Naperville, IL (US);
Michael J. Pellin, Naperville, IL (US);
Marius Stan, Chicago, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 121 days.

(21) Appl. No.: 14/017,173

(22) Filed: Sep. 3, 2013

(65) Prior Publication Data

US 2015/0063521 A1 Mar. 5, 2015

(51) Int. Cl.
*G21C 3/20* (2006.01)
*G21C 21/02* (2006.01)
*G21C 3/04* (2006.01)
*G21C 3/07* (2006.01)

(52) U.S. Cl.
CPC ............... *G21C 21/02* (2013.01); *G21C 3/044* (2013.01); *G21C 3/07* (2013.01); *G21C 3/20* (2013.01); *G21C 2003/045* (2013.01); *Y02E 30/40* (2013.01)

(58) Field of Classification Search
USPC .......................................... 376/417; 427/5, 6
See application file for complete search history.

(56) References Cited

U.S. PATENT DOCUMENTS

| | | | | |
|---|---|---|---|---|
| 2,969,294 A | * | 1/1961 | Shyne | 427/5 |
| 3,776,759 A | * | 12/1973 | Ford | C04B 35/52 264/0.5 |
| 4,061,700 A | * | 12/1977 | Gallivan | G21C 3/623 252/639 |
| 5,654,246 A | * | 8/1997 | Newkirk et al. | 501/80 |
| 7,666,463 B1 | * | 2/2010 | Youchison et al. | 427/5 |
| 8,084,087 B2 | | 12/2011 | Bent et al. | |
| 8,318,248 B2 | | 11/2012 | Elam et al. | |
| 8,629,076 B2 | * | 1/2014 | Worsley et al. | 502/183 |
| 2008/0274282 A1 | | 11/2008 | Bent et al. | |
| 2012/0087457 A1 | * | 4/2012 | Garnier | C04B 35/565 376/416 |
| 2012/0140867 A1 | * | 6/2012 | Venneri | G21C 3/20 376/414 |
| 2012/0263876 A1 | | 10/2012 | Haukka et al. | |

FOREIGN PATENT DOCUMENTS

WO 02086994 10/2002

OTHER PUBLICATIONS

Y. Katoh A. Kohyama, T. Nozawa, M. Sato, SiC/SiC composites through transient eutectic-phase route for fusion applications, J. Nucl. Mater., 329 (2004) 587-591.

(Continued)

*Primary Examiner* — Sean P Burke
(74) *Attorney, Agent, or Firm* — Cherskov Flaynik & Gurda, LLC

(57) ABSTRACT

A nuclear fuel pellet with a porous substrate, such as a carbon or tungsten aerogel, on which at least one layer of a fuel containing material is deposited via atomic layer deposition, and wherein the layer deposition is controlled to prevent agglomeration of defects. Further, a method of fabricating a nuclear fuel pellet, wherein the method features the steps of selecting a porous substrate, depositing at least one layer of a fuel containing material, and terminating the deposition when the desired porosity is achieved. Also provided is a nuclear reactor fuel cladding made of a porous substrate, such as silicon carbide aerogel or silicon carbide cloth, upon which layers of silicon carbide are deposited.

17 Claims, 5 Drawing Sheets

(56) References Cited

OTHER PUBLICATIONS

V. Raman, O. Bhatia, S. Bhardwaj, A.K. Srivastva, K.N. Sood, Synthesis of silicon carbide nanofibers by sol-gel and polymer blend techniques, Journal of Materials Science, 40 (2005) 1521-1527.

Y. Katoh, N. Hashimoto, S. Kondo, L.L. Snead, A. Kohyama, Microstructural development in cubic silicon carbide during irradiation at elevated temperatures, J. Nucl. Mater., 351 (2006) 228-240.

T. Noda, H. Araki, H. Suzuki, F. Abe, M. Okada, Impurities and evaluation of induced activity of SiC composites prepared with chemical vapor infiltration, Journal of Nuclear Science and Technology, 31 (1994) 1059-1065.

K. Shimoda, T. Hinoki, H. Kishimoto, A. Kohyama, Enchanced high-temperature performances of SiC/SiC composites by high densification and crystalline structure, Composites Science and Technology, 71 (2011) 326-332.

K. Shimoda, C. Colin, H. Kishimoto, S. Doriota, Iop, Ion-irradiation effect on high-temperature behaviors of advanced SiC fibers, in: 3rd International Congress on Ceramics, 2011.

K. Hayakawa, H. Kishimoto, J.S. Park, H.C. Jung, Y. Kohno, A. Kohyama, Iop, Microstructure and Property Changes of SiC Fiber under Thermal and Ion Irradiation Environments, in: 3rd International Congress on Ceramics, 2011.

K. Shimoda, T. Hinoki, Y. Katoh, A. Kohyama, Development of the tailored SiC/SiC composites by the combined fabrication process of ICVI and NITE methods, J. Nucl. Mater., 384 (2009) 103-108.

Y. Katoh, T. Nozawa, L.L. Snead, T. Hinoki, Effect of neutron irradiation on tensile properties of unidirectional silicon carbide composites, J. Nuc!. Mater., 367 (2007) 774-779.

K.A. Terrani, L.L. Snead, J.C. Gehin, "Microencapsulated fuel technology for commercial light water and advanced reactor application," Journal of Nuclear Materials, 427 (2012) 209-224.

K. Yueh, D. Carpenter, H. Feinroth, "Clad in Clay," Nuclear Engineering International, Jan. 2010, 14-16.

L. Hallstadius, S. Johnson, E. Lahoda, "Cladding for High Performance Fuel," Progress in Nuclear Energy, vol. 57, May 2012.

H.E. Khalifa, C.P. Deck, K.C. Chen, C.A. Back, Silicon carbide composite fabrication and mechanical and thermal performance for nuclear reactor applications, Fusion Science and Technology, 61 (2012)375-380.

* cited by examiner

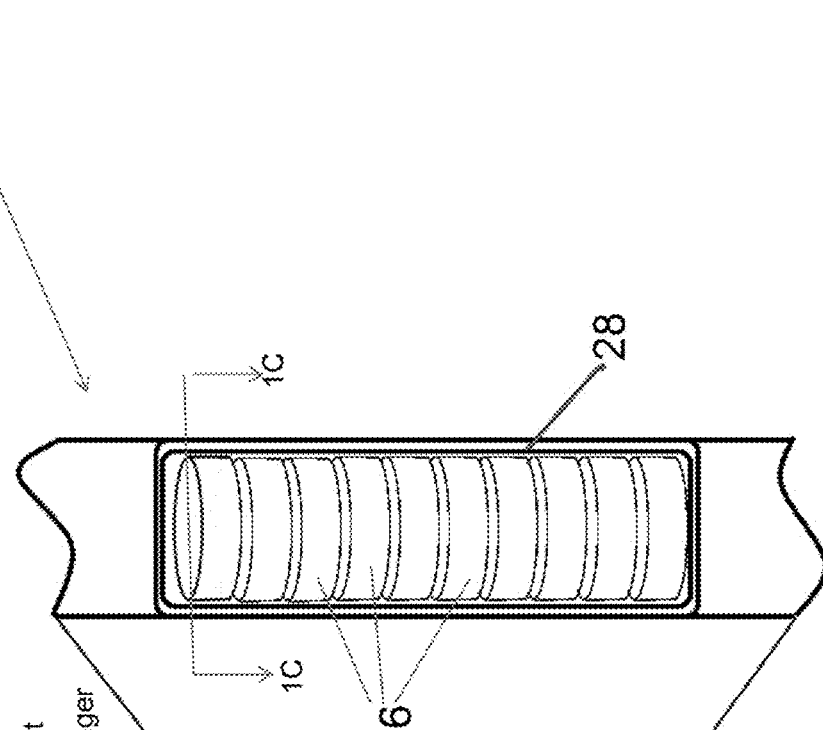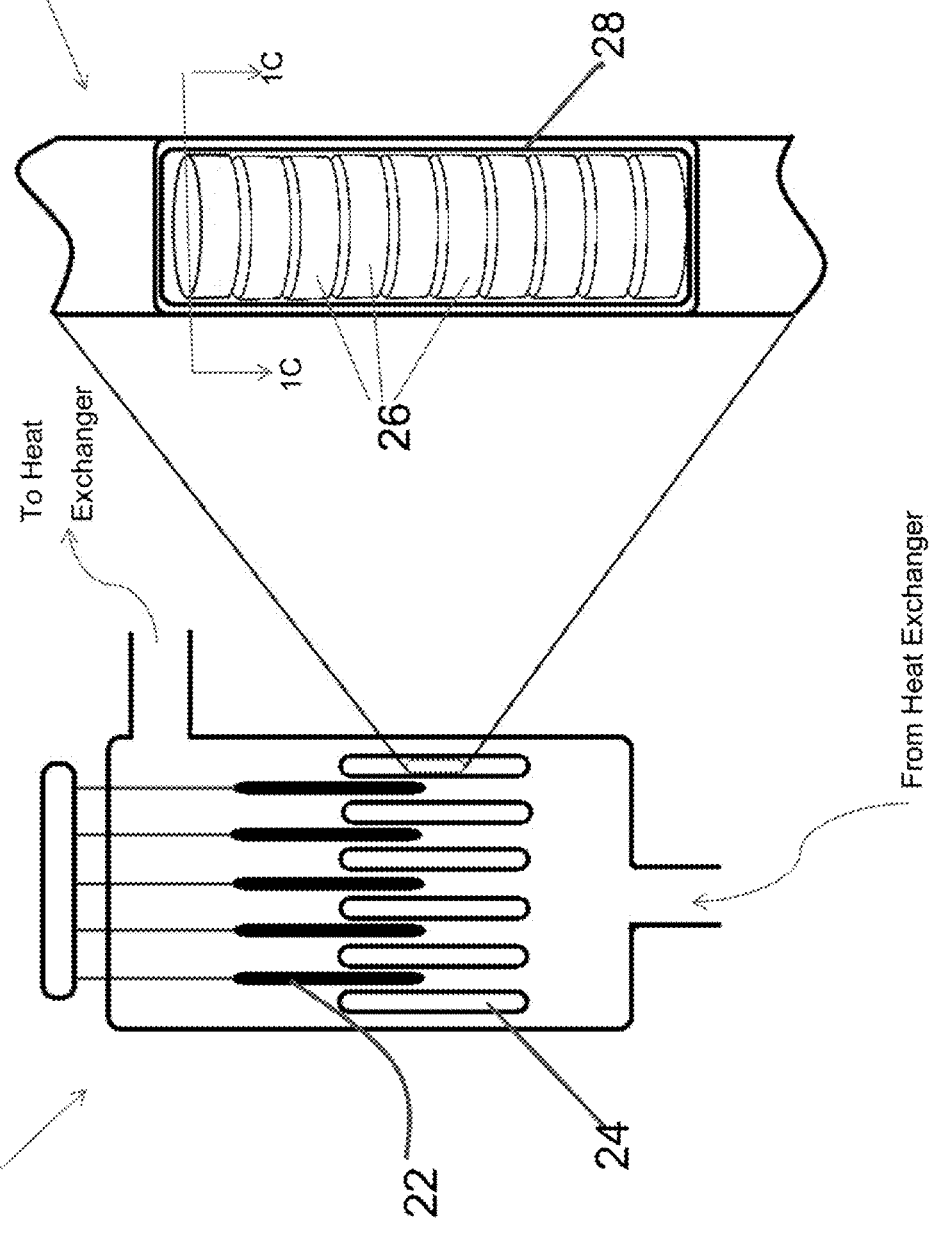

US 9,437,335 B2

DESIGNED POROSITY MATERIALS IN NUCLEAR REACTOR COMPONENTS

CONTRACTUAL ORIGIN OF THE INVENTION

The United States Government has rights to this invention pursuant to Contract No. DE-AC02-06CH11357 between the United States Government and UChicago Argonne, LLC representing Argonne National Laboratory.

BACKGROUND OF THE INVENTION

1. Field of the Invention

The present invention relates to atomic layer deposition coatings onto porous materials to provide nuclear fuel pellets and claddings of superior mechanical and thermal properties, which will help increase such components' operational life and improve the efficiency and safety of current light water nuclear reactors.

2. Background of the Invention

The inside of a nuclear reactor is an extremely harsh environment. Not only are materials subject to temperatures as high as 1800° C. at the center of the fuel pellet and to highly corrosive steam, but they are also subject to damage from neutron bombardment.

Neutrons cause fission reactions in typical Light Water Reactors (LWRs). LWRs utilize the energy produced from fission reactions occurring in the fuel elements to heat water or steam in the reactor core. This water or steam travels through a heat exchanger to heat clean water into clean steam, and this clean steam turns downstream turbines to produce mechanical energy or motion. The mechanical energy turns a generator which results in the production of electricity.

The water or steam in the reactor core is part of a closed loop that does not mix with, or contaminate, the clean water used to turn the turbines. A representation of a typical LWR arrangement is depicted in FIG. 1A. A nuclear reactor core 20 contains a series of co-planarly arranged fuel rods 24 between which are positioned control rods 22. The control rods 22 are made of highly neutron absorbent materials such as silver, indium, hafnium, boron, and cadmium. Depending on power requirements called for by the grid, the control rods 22 are either partially or fully inserted or removed from between the fuel rods to moderate the flux of neutrons, and therefore the amount of fission. This moderation is proportional to the amount of energy produced.

As depicted in FIG. 1B, the fuel rods 24 house the fissile material, typically in the form of fuel pellets 26. In a typical LWR, the fuel pellets 26 contain the fissile material, usually in the form of a sintered oxide, such as uranium dioxide. Encapsulating the fuel pellets 26 is a cladding layer 28, which is typically made of zirconium or a zirconium alloy.

As can be seen in FIG. 1C, the cladding material 28 surrounds the fuel pellet 26, but a gap 30 must be provided to allow for the expansion of the fuel pellet 26 and the cladding layer 28. Expansion occurs primarily because of the nuclear irradiation. Because the fuel pellet 26 and cladding 28 are constantly being bombarded by neutrons, individual atoms on the lattice structure of the fuel pellet 26 and cladding 28 are displaced. During the operational life of the fuel pellet 26 and cladding 28, each atom is displaced from its lattice site thousands of times on average. These displacements lead to the agglomeration of defects, which can create large voids in the lattice structure. The structural changes to the atomic lattice happen randomly in prior art sintered fuel pellets and in zirconium-based claddings, which means that the fuel pellets 26 and cladding 28 do not expand uniformly or quickly. Structural changes to the atomic lattice do not reach dynamic equilibrium before the fuel pellets 26 have materially degraded and need to be replaced. Further, the cladding 28 can no longer be trusted to contain the nuclear fuel.

The mechanical degradation of the fuel pellet 26 and cladding 28 raises concerns of contamination. Maintaining the separation of reactor core coolant water and clean water for powering the turbines is critical to the operation of a nuclear power plant. Contamination of the clean water can happen through a variety of circumstances. Meltdown, in particular, can lead to a severe breach of containment. Meltdown occurs when a component or components of the reactor core melt, releasing radioactive materials, including the fuel and fission products. When the fuel pellets 26 and cladding 28 are mechanically vulnerable, the possibility of leaching nuclear material into the coolant water is greatly increased.

Typical fuel pellets are made of sintered uranium dioxide ($UO_2$). The uranium present in the pellets is mostly uranium-238, which has been enriched to contain approximately three percent uranium-235. The uranium-235 is the major fuel of the LWR, but the uranium-238 is fissionable and produces plutonium-239, which also fuels the LWR. In some reactors, the pellets are made of both uranium and plutonium oxides and are referred to as mixed oxide fuels.

Claddings 28 are commonly made of a zirconium-based alloy. Zirconium has exceptional properties for use in nuclear reactors including low-neutron absorption, high hardness, ductility, and corrosion resistance. Zirconium alloys typically contain greater than 95% zirconium and other metals, such as tin, niobium, iron, chromium, and nickel. However, zirconium is prone to hydrogen embrittlement at high-temperatures, especially after a loss-of-coolant-accident (LOCA). The zirconium will react with the water or steam and form an oxide, which produces hydrogen gas. Not only does the presence of hydrogen gas increase the risk of an explosion, but it causes hydrogen embrittlement. The hydrogen embrittlement leads to blistering and cracking of the cladding 28 through which radioactive materials can escape. Further, despite zirconium's low neutron absorption, the cladding 28 experiences significant radiation expansion during its operational life.

In a nuclear reactor, the fuel capacity of the uranium dioxide is generally not completely consumed. Over the 3-5 year operational life of a prior art uranium dioxide pellet, only approximately 5% of the available fuel has been fissioned. Replacement of the fuel pellets 26 and cladding 28 is necessitated by the mechanical degradation of those components. Therefore, not only is much of the fuel wasted, but it also must be carefully stored. Storage can be accomplished on-site, but often times the radioactive waste materials must be moved to other locations to accommodate the large amount of storage necessary.

Another problem facing prior art fuel pellets 26 and claddings 28 is the heat conduction from the center of the pellet 26 to the exterior of the cladding 28. Thermal transport of heat from the fuel elements is critical for optimized reactor operations. The performance of nuclear fuels strongly depends on the operating temperature. Optimized thermal transport also extends the operation limit of nuclear fuels. Fuel porosity and fuel stoichiometry are critical factors in thermal transport.

The heat conduction of uranium dioxide is poor relative to that of the cladding material. This can cause high heat build-up within a fuel rod, leading to failure. Over time, temperatures at the center of the fuel pellet 26 become much higher than at the exterior of the cladding 28. At an operational temperature of 1800° C., the heat conduction of uranium dioxide is approximately 2 W/mK (where mK is meters-Kelvin), while the heat conduction of zirconium is 35 W/mK. The poor heat conduction is exacerbated by the expansion gap 30 between the pellet 26 and the cladding 28.

A need exists in the art to increase the efficiency and operational life of nuclear fuel pellets. Such a pellet would allow for a more complete fission of the fuel material. More fissions would increase the operational life of the fuel pellet, which would cut down on the amount of pellets that would have to be used. This, in turn, would reduce the waste produced and lessen the need for storage facilities and transportation to storage facilities.

Another need exists in the art for a cladding that is able to withstand extreme temperatures, oxidation, and hydrogen embrittlement. The cladding should resist bubbling and cracking and prevent the escape of radioactive materials. Further, such a cladding should have a long operational life.

Still another need exists in the art for a fuel pellet and cladding that is designed to aid in the prevention of meltdown. Such a pellet would allow for the efficient conduction of heat out of the nuclear reactor core, preventing the build-up of heat and an increase in temperature. This improved conductivity would also allow for a more efficient transfer of energy to the water in the heat exchanger, which would mean that more useful energy is produced by each fission.

SUMMARY OF THE INVENTION

An object of the present invention is to provide a nuclear fuel substrate that overcomes many of the drawbacks of the prior art.

Another object of the present invention is to improve the heat conduction through a nuclear fuel rod. A feature of the present invention is nuclear fuel deposited onto porous support material. An advantage of the invention is that such a deposition minimizes expansion that otherwise occurs with nuclear fuel upon heating. This minimization in expansion allows for minimization of any gap between fuel and cladding during fuel assembly, and even physical contact of the fuel with the cladding during fuel assembly.

Another object of the present invention is to increase the efficiency of nuclear reactors. A feature of the present invention is the use of porous support materials for nuclear fuel. An advantage of the invention is that the pores provide a means for efficient gas venting from the fuel and perhaps out of the cladding. This controlled release of gas which develops during nuclear fuel use, prevents expansions of the fuel and/or the cladding due to increased gas pressure.

Still another object of the present invention is to provide an alternative to sintered uranium dioxide fuel pellets. A feature of the present invention is that atomic layer deposition of fuel allows for other uranium compounds to be utilized. An advantage is that these other uranium compounds provide better heat conduction, thereby increasing the safety and efficiency of the reactor core.

Yet another object of the present invention is to increase the usable life of nuclear fuel pellets. A feature of the present invention is that nuclear fuel pellet begins their operational lives near a dynamically stable equilibrium as a result of the designed porosity. An advantage of the present invention is that typical deterioration of material properties of the pellets and cladding is minimized, thereby leading to extended life cycles of the fuel.

Yet another object of the present invention is to reduce the waste of nuclear fuel materials. A feature of the present invention is a more complete use of fissile materials. An advantage of the present invention is that less fuel materials are needed and less spent nuclear fuel materials have to be stored.

Yet another object of the present invention is to provide a more efficient fuel pellet with a longer operational life that can be used in currently operating nuclear reactors. A feature of the present invention is that the fuel pellets are the same size and offer the same amount of heat as currently available sintered fuel pellets. An advantage of the present invention is that currently operating reactors do not need to be retrofitted in order to accommodate the presently invented fuel pellets.

Yet another object of the present invention is to provide a silicon carbide (SiC) cladding material for use with nuclear fuel scenarios. A feature of the present invention is the resistance to extreme environments, including temperature resistance, corrosion resistance, oxidation resistance, and a resistance to hydrogen embrittlement. An advantage of the present invention is that SiC cladding can withstand rapid water cooling, which takes place when the reactor core overheats.

Yet another object of the present invention is to provide an SiC cladding for nuclear fuel configurations. A feature of the invention is atomic layer deposition (ALD) of a uniform and nearly defect-free coating of SiC on aerogel substrates. An advantage of the present invention is that the defect free coatings confer improved corrosion and wear resistance to the claddings.

The present invention relates to a nuclear fuel pellet, comprising a porous substrate, at least one layer of a fuel containing material deposited upon said porous substrate via atomic layer deposition, wherein the layer deposition is controlled to prevent agglomeration of defects.

The present invention is also directed to a method of fabricating a nuclear fuel pellet, said method comprising the steps of selecting a porous substrate, depositing at least one layer of a fuel containing material onto the substrate and terminating deposition when a predetermined porosity is achieved.

The present invention provides a nuclear reactor fuel cladding, said cladding comprising a porous substrate and at least one layer of silicon carbide deposited on the substrate.

BRIEF DESCRIPTION OF THE DRAWINGS

The invention together with the above and other objects and advantages will be best understood from the following detailed description of the preferred embodiment of the invention shown in the accompanying drawings, wherein:

FIG. 1A is a representation of a prior art nuclear reactor core;

FIG. 1B is a detail, cutaway view of a prior art nuclear fuel rod as depicted in FIG. 1A;

DETAILED DESCRIPTION OF THE INVENTION

Figure 1C:
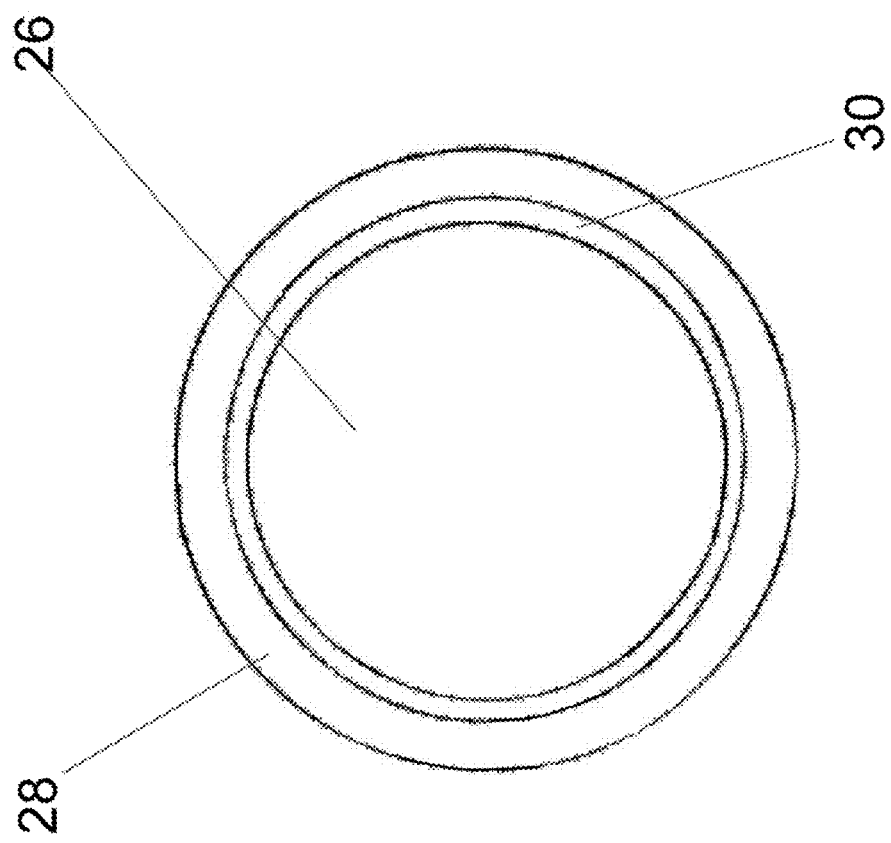
FIG. 1C is a plan view of the prior art nuclear fuel rod taken along line 1C-1C, as depicted in FIG. 1B.

The foregoing summary, as well as the following detailed description of certain embodiments of the present invention, will be better understood when read in conjunction with the appended drawings.

As used herein, an element step recited in the singular and preceded with the word "a" or "an" should be understood as not excluding plural said elements or steps, unless such exclusion is explicitly stated. Furthermore, the references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The invented method imparts size selected porosity to substrates which are subsequently overlayed by adherent film comprising nuclear fuel. This engineered porosity of the resulting pellet enables the fuel to begin its operational life at near equilibrium state. The degradation of fuel cladding from nuclear bombardment can be reduced, thereby increasing the operational life of the pellet and allowing for more fission reactions. Porosity can vary from about 3 to about 30 percent, and preferably from 15 to 30 percent of volume of the fuel. A model of suitable porous material includes pores approximately 0.02 mm and approximately 0.2 mm apart in both azimuthal and axial directions. The resulting distance between pores in the radial direction is also approximately between 0.02 mm and approximately 0.2 mm. The distance between the uppermost plane of pores and the top surface of the fuel element is approximately about 0.01 mm to 0.1 mm as is the distance between the lowermost plane of pores and the bottom surface of the fuel element. These values enable a uniform distribution of pores in the volume, for example when dealing with pores between 10 and 200 microns in diameter. However, spatial distribution of pores may be non-uniform (i.e., heterogeneous) to enhance the heat transport in the material. Various pore configurations are also suitable, including but not limited to spherical-, ellipsoid- and cylindrical- (i.e. disc-shaped pores) shapes.

In an embodiment of the invention, at fixed total porosity, certain heterogenous spatial distributions of pores lead to improved thermal transport (i.e., lower centerline temperature of the fuel pellet) compared with homogeneous distributions. Situating larger pores at higher temperature regions (inner area regions) and smaller pores at lower temperature regions (outer edge areas) improves heat transport in the fuel pellet.

ALD is a sequential, self-limiting synthesis technique that allows conformal coating of large areas and complex shapes. ALD is sequential because alternating precursors are introduced to the substrate, forming a layer over the substrate one atom thick. The second precursor is introduced, which reacts with the first precursor, again forming another layer that is a single atom thick. ALD is self-limiting because the precursors wet the entire substrate surface. When the second precursor is introduced, the reaction with the first precursor proceeds until there is no available reaction area. The remainder of the precursor is pumped away.

Figure 2A:
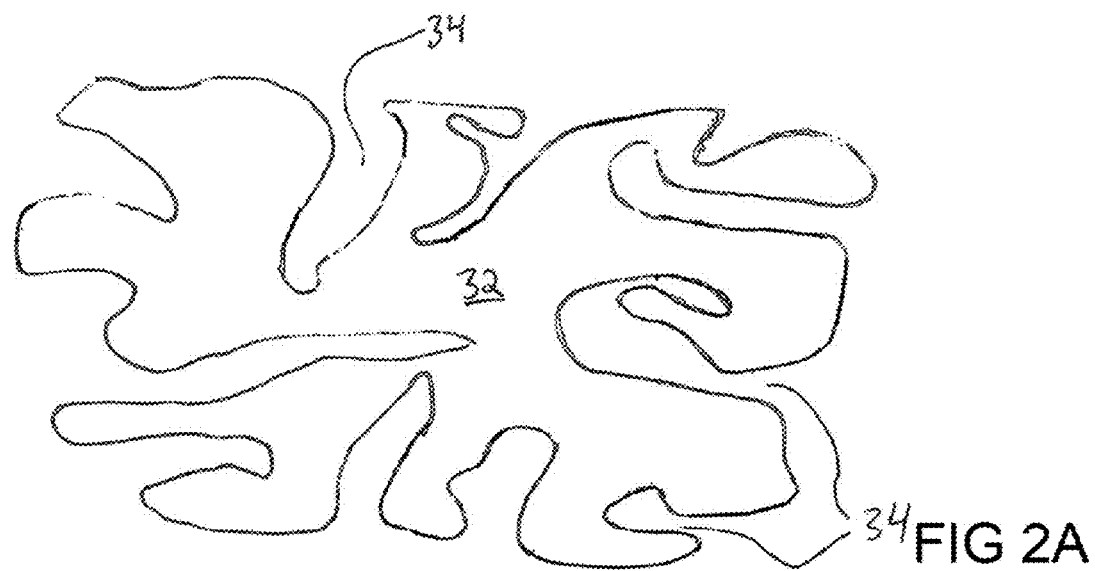
FIG. 2A is a representation of a porous substrate for a nuclear fuel pellet in accordance with the features of the present invention.
Figure 2B:
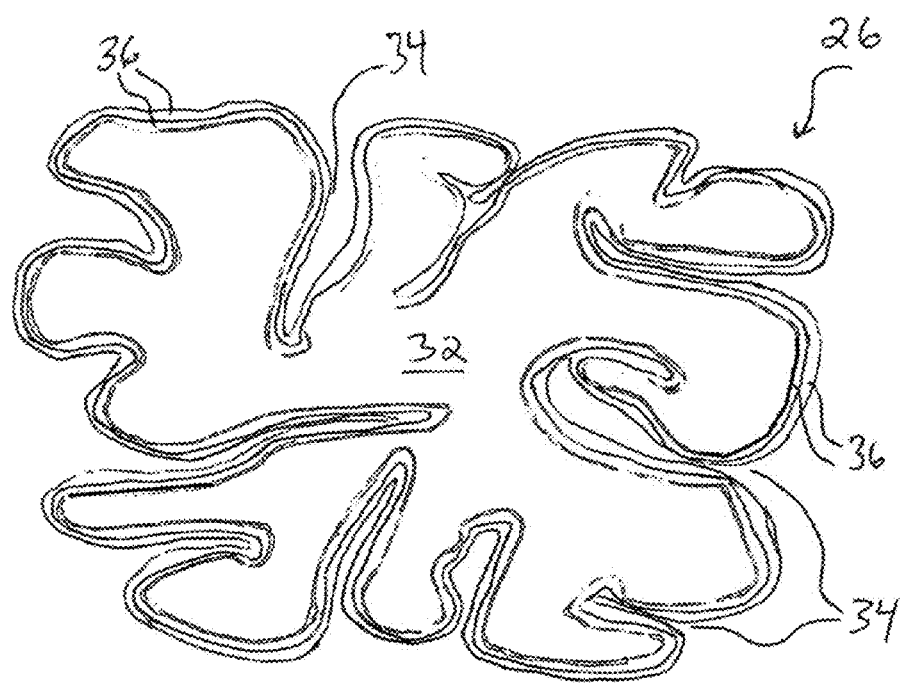
FIG. 2B shows atomic layer deposition of the nuclear fuel material onto the porous substrate, in accordance with the features of the present invention.

As can be seen in FIG. 2A, the fuel pellet 26 is formed from a porous substrate 32. An exemplary substrate is an aerogel. Aerogels have enough structural integrity to hold their shape, while also having an extremely low density. As applied by the inventors, ALD allows for creating open (i.e., pores extending completely through the substrate) or closed pores. Closed pores provide a means for retaining the gas and avoid gas release into the plenum (i.e., the head space between the pellets and the top of the rod. Open pores allow the gas to collect in the plenum for extraction via a vent in the rod.

Suitable materials from which the aerogel can be constructed are carbon, beryllium oxide, aluminum, or tungsten. These materials are capable of high thermal conduction and can readily be made into aerogels. Aerogels have been created with a density of which would allow room for a large volume of fissile material to be deposited. In an embodiment of the invention, the fuel is deposited throughout the support substrate and not just on its surface. The higher the volumetric density of the fuel, the better.

Aerogels can be created via sol-gel processes. First, a colloidal suspension of solid particles is created. This requires mixing precursor solutes with a solvent. The precursor and solvent will undergo a reaction, which produces the suspended particles. These particles begin to interlink, at which point a catalyst may be used to increase reaction rate. Interlinking stops when a gel has been formed.

Residual reagents are removed in a way to prevent gel damage. Specifically, supercritical drying is used, whereby the liquid is heated and pressurized until a supercritical fluid state is reached. The pressure is then dropped, causing the fluid to gasify, and the gas is removed. In the case of the fuel pellets 26, the aerogel would be created near net shape.

The porous substrate 32 is serially contacted with a plurality of precursors. By alternating precursors, the thickness of the deposition can be controlled as can be seen in FIG. 2A. Because of the low density of the porous substrate 32 compared to the fuel it supports, the overall size of the pores 34 in the fuel pellet 26 can be controlled by limiting the number of deposited layers 36.

Figure 3A:
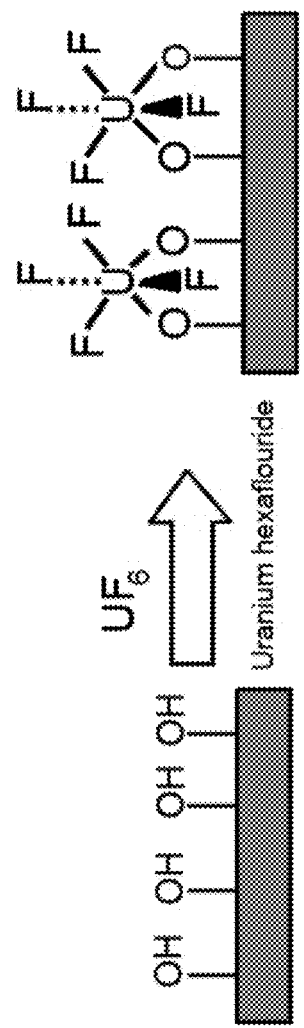
FIG. 3A is a schematic depiction of an initial atomic layer deposition surface reaction on a porous substrate of the nuclear fuel pellet.
Figure 3B:
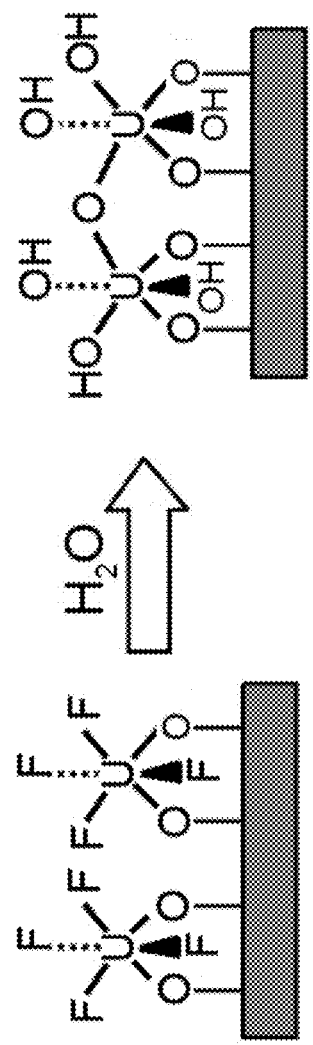
FIG. 3B is a depiction of the second atomic layer deposition surface reaction on the porous substrate of the nuclear fuel pellet.

The surface reaction is depicted in FIG. 3A and FIG. 3B. Specific moieties covalently or noncovalently linked to surfaces of the gel terminate in hydroxyl groups. These hydroxyl groups react with a first fuel precursor, such as uranium hexafluoride ($UF_6$). This results in the generation of an ether group comprising four fluorines and two oxygens bound to a central uranium atom.

Upon creation of the tetrafluorouranium moiety, the reaction chamber is flushed, replaced or otherwise neutralized. A suitable replacement means is a relatively inert gas, such as nitrogen, helium or argon. After reaction atmosphere neutralization, water is then introduced into the atmosphere in an amount and for a time sufficient to react with the remaining four fluorine atoms. This water reaction generates four leaving groups (hydrofluoric acid) which are substituted by hydroxyl moieties.

The reaction environment is then replaced with an inert gas again. The first precursor is reintroduced in an amount and for a time sufficient to react with the hydroxyls. The above reaction sequence results in the production of a layer of uranium dioxide upon the porous substrate 32. However, it should be noted that other precursors will generate different layers, which can be used in place of the uranium dioxide, or in combination with the uranium dioxide. The invention is particularly suitable for use with metallic fuels such as uranium-zirconium, uranium-molydenum and uranium nitride.

As noted supra, state of the art sintered uranium dioxide fuel pellets have a density of approximately 93% prior to service. After 40 GWd/t (gigawatt-days/metric ton [a measure of nuclear fuel burnup]), the density is decreased another 5% to 88%. Then the pellet is replaced.

By contrast, the invented fuel pellet 26 enters service at approximately 90% density. However, the porosity would be structured such that atom displacements would not create randomly distributed voids and bubbles in the lattice. Consequently, the fuel pellet 26 does not experience a substantial decrease in density.

The pellets 26 enter service at near net shape, which means that the pellets 26 do not experience significant radiation expansion. The invented method and resulting product allow for substantial physical contact between exterior peripheries of the pellets and cladding encircling those pellets. (As noted supra, state of the art sintered pellets require a gap 30 to allow for expansion.) The gap 30 is substantially diminished or removed entirely, which will allow for better heat conduction from the pellet 26 to the cladding 28.

The invented porous substrate improves heat conduction. A feature of the invention is that materials chosen for the porous substrate 32 have thermal conductivities much higher than that of uranium dioxide, which would provide additional heat dissipation from the center of the fuel pellet 26. An aerogel with high thermal conductivity, such as beryllium oxide (330 W/mK), tungsten (173 W/mK), carbon (up to 165 W/mK), or aluminum nitride (285 W/mK), would provide a network of heat dissipation to limit heat build-up at the center of the fuel pellet 26.

The invented method and composite provides cladding more resistant to the harsh conditions of nuclear reactors. This results in higher efficiencies and enhanced safety. Moreover, the operational life of cladding is extended, thereby minimizing reactor shutdown time and exposure to radioactive materials.

Figure 4A:
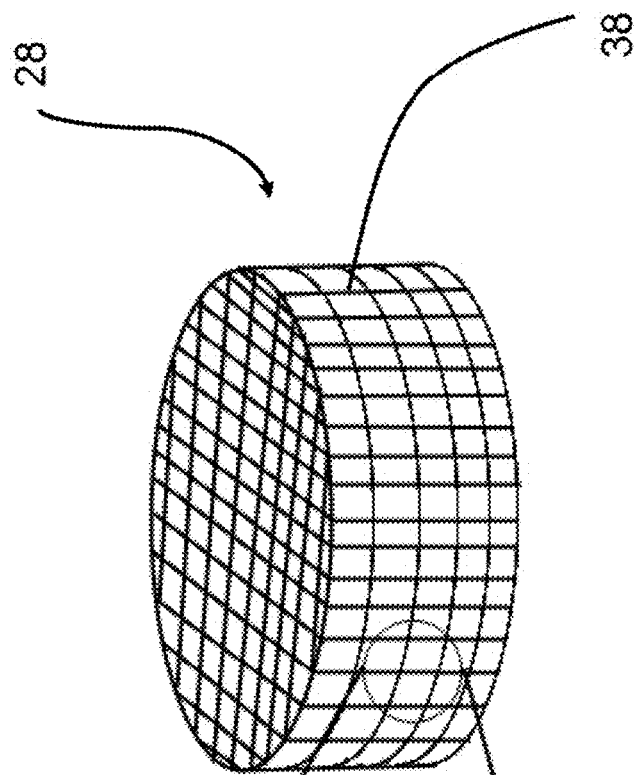
FIG. 4A is a schematic representation of a porous substrate for a cladding material in accordance with the features of the present invention.
Figure 4B:
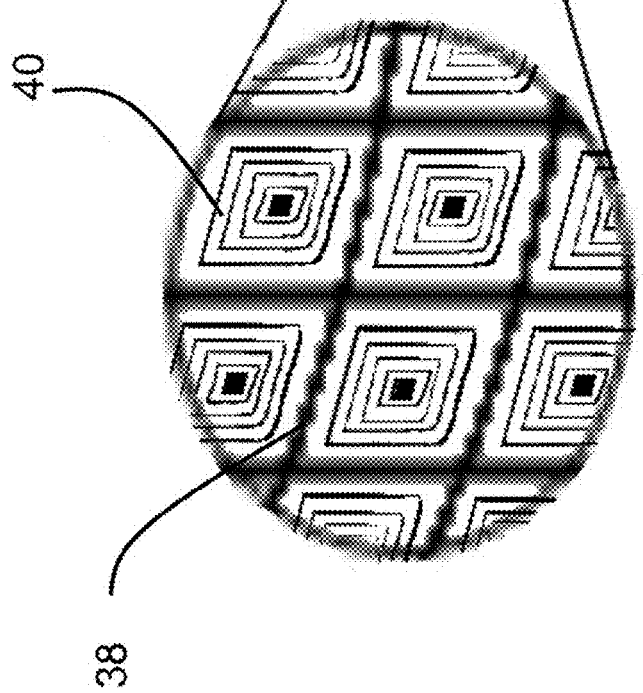
FIG. 4B is a detail view of FIG. 4 showing the atomic layer deposition of the nuclear fuel material in accordance with features of the present invention.

The invention also provides cladding 28 formed from a porous substrate 38, as depicted in FIG. 4A. In an embodiment of the invention, the porous substrate is an aerogel comprising a material that can withstand the temperatures produced in fission reactions. Also, combinations of such constituents are suitable such that a support comprises a heterogeneous mixture of components. A preferred component is SiC aerogel. Another preferable substrate is SiC cloth, available from Nippon Carbon Co., Ltd. in Japan and Ube Industries, Ltd. in Japan. SiC cloth has high strength and temperature resistance.

The present invention seeks to use ALD to fill the porosity of SiC aerogels or SiC cloth. The porous substrate 38 is then exposed to alternating precursors A' and B'. The process would proceed much like the process of creating the fuel pellets with the exception that no pores would be left in the cladding. Layers 40 would be deposited via ALD until a uniform and largely defect-free coating has been applied. A first precursor of silane ($SiH_4$) would be followed by a second precursor of acetylene ($C_2H_2$). The silane would be introduced in a reaction chamber set at 900° C. for at least 10 seconds. The chamber would then be flushed with an inert gas, such as nitrogen. The second precursor, acetylene, would be introduced and reside in the chamber for approximately 10 seconds. The chamber would be flushed with inert gas again. Water vapor would be introduced for an appropriate residence time. Finally, the chamber would be flushed with inert gas a final time before the first precursor is reintroduced, starting the process of building the next layer of SiC.

An additional benefit of an SiC cladding is an increased thermal conductivity compared to that of zirconium-based claddings. The thermal conductivity of zirconium decreases with increasing temperature, but at operational temperatures of 500-600° C., the conductivity of SiC is approximately 140 W/mK. As mentioned supra, zirconium-based alloys have a heat conductivity of approximately 35 W/mK at operational temperatures. Accordingly, an SiC cladding would provide better heat dissipation, thereby preventing temperature buildup in the fuel pellets and increasing operating efficiency of the reactor.

The fuel pellets 26 and cladding 28 of the present invention also have the advantage that they can be used with currently operating LWRs. The fuel pellets 26 of the present invention can simply replace the currently used sintered fuel pellets. There would not have to be any retrofitting of equipment to accommodate the switchover to the presently invented fuel pellets 26. The SiC cladding 28 could also simply replace the cladding currently used in LWRs.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. §112(f) unless and until such claim limitations expressly use the phrase "means for" followed by a statement of function void of further structure.

The present methods can involve any or all of the steps or conditions discussed above in various combinations, as desired. Accordingly, it will be readily apparent to the skilled artisan that in some of the disclosed methods certain steps can be deleted or additional steps performed without affecting the viability of the methods.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least,"

"greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property right or privilege is claimed is defined as follows:

1. A nuclear fuel pellet, comprising:
    a porous substrate; and
    a plurality of layers of a fuel containing material deposited via atomic layer deposition upon said porous substrate, wherein the total porosity of the nuclear fuel pellet is between about 3 and 30 percent, wherein the porous substrate underlies the deposited layers of the fuel.

2. The nuclear fuel pellet of claim 1, wherein the fuel containing material is fissile material selected from the group consisting of uranium dioxide, plutonium dioxide, uranium-zirconium, uranium molybdenum and uranium nitride, and combinations thereof.

3. The nuclear fuel pellet of claim 1, wherein said porous substrate is an aerogel which defines pores which extend through the substrate.

4. The nuclear fuel pellet of claim 1, wherein the fuel overlays substantially all of the surfaces of the substrate which define pores.

5. The nuclear fuel pellet of claim 1, wherein the porous substrate has a density less than the density of the fuel.

6. The nuclear fuel pellet of claim 5, wherein the porous substrate is selected from the group consisting of carbon, tungsten, beryllium oxide, and aluminum nitride.

7. The nuclear fuel pellet of claim 1, wherein the fuel pellet has an overall density of about 90% of the density of the fuel material.

8. The nuclear fuel pellet of claim 1, wherein the pores within the pellet have a uniform size and distribution.

9. The nuclear fuel pellet of claim 1, wherein the pores at the surface of the pellet are smaller than the pores at the center of the pellet and wherein the size of the pores tapers between the center and the surface of the pellet.

10. The nuclear fuel pellet of claim 1, wherein the fuel pellet has closed pores.

11. The nuclear fuel pellet of claim 1, wherein the pores are uniformly distributed throughout the pellet and wherein the pores are spaced between about 0.02 mm and about 0.2 mm apart from each other.

12. The nuclear fuel pellet of claim 1 wherein the porosity of the pellet is between about 15 and 30 percent.

13. A nuclear reactor fuel cladding, said cladding comprising:
    a porous substrate of silicon carbide, wherein the substrate is substantially a hollow tube, and wherein the porous substrate surrounds nuclear fuel without an underlying liner between said fuel and said porous substrate; and
    at least one layer of silicon carbide deposited on the substrate via atomic layer deposition.

14. The nuclear reactor fuel cladding of claim 13, wherein the porous substrate is a silicon carbide aerogel.

15. The nuclear reactor fuel cladding of claim 13, wherein the porous substrate is a silicon carbide cloth.

16. The nuclear reactor fuel cladding of claim 13, wherein the at least one layer of silicon carbide deposition is one atom thick.

17. The nuclear reactor fuel cladding of claim 13, wherein the coating of silicon carbide is conformal and substantially defect free.

* * * * *